UNITED STATES PATENT OFFICE.

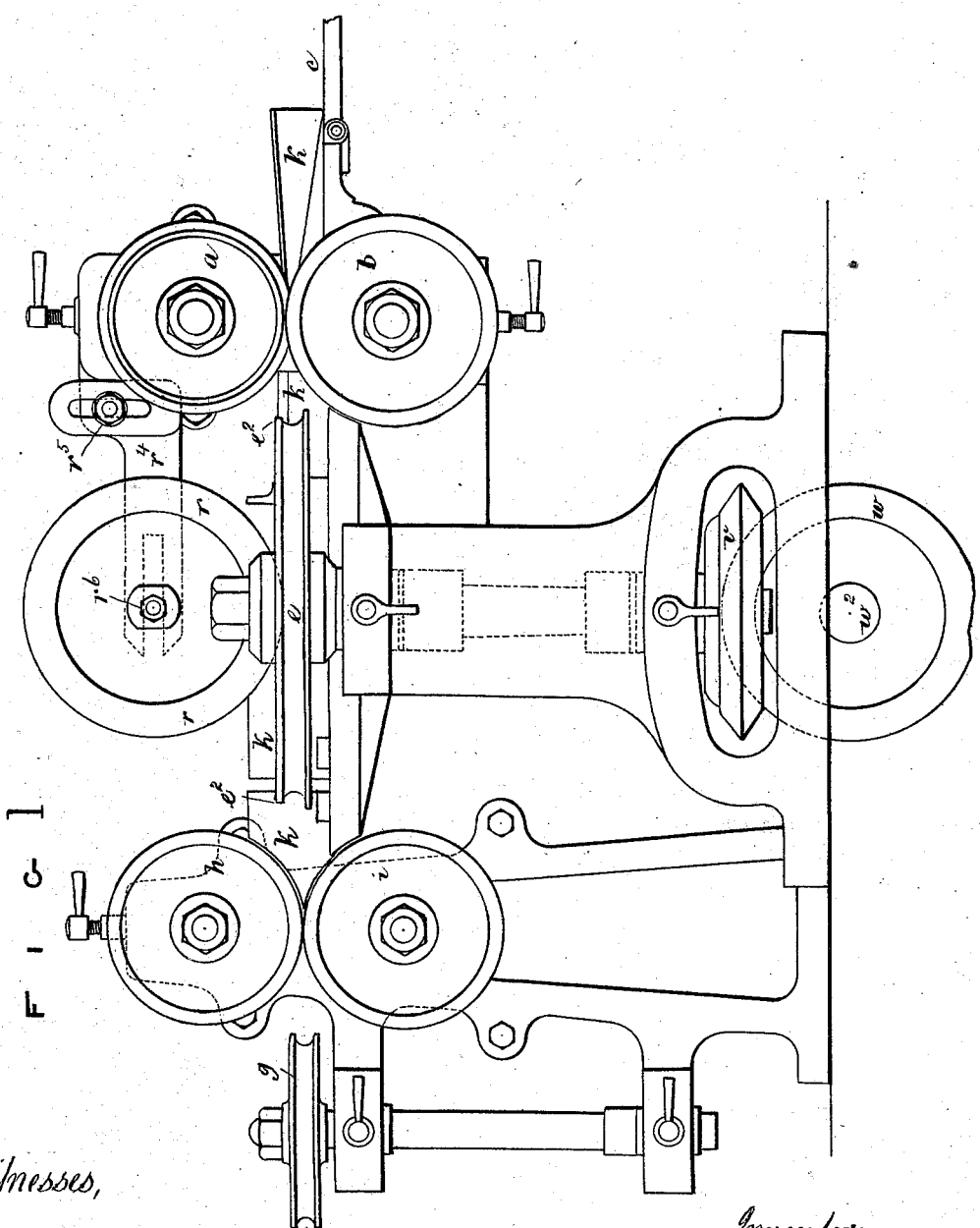

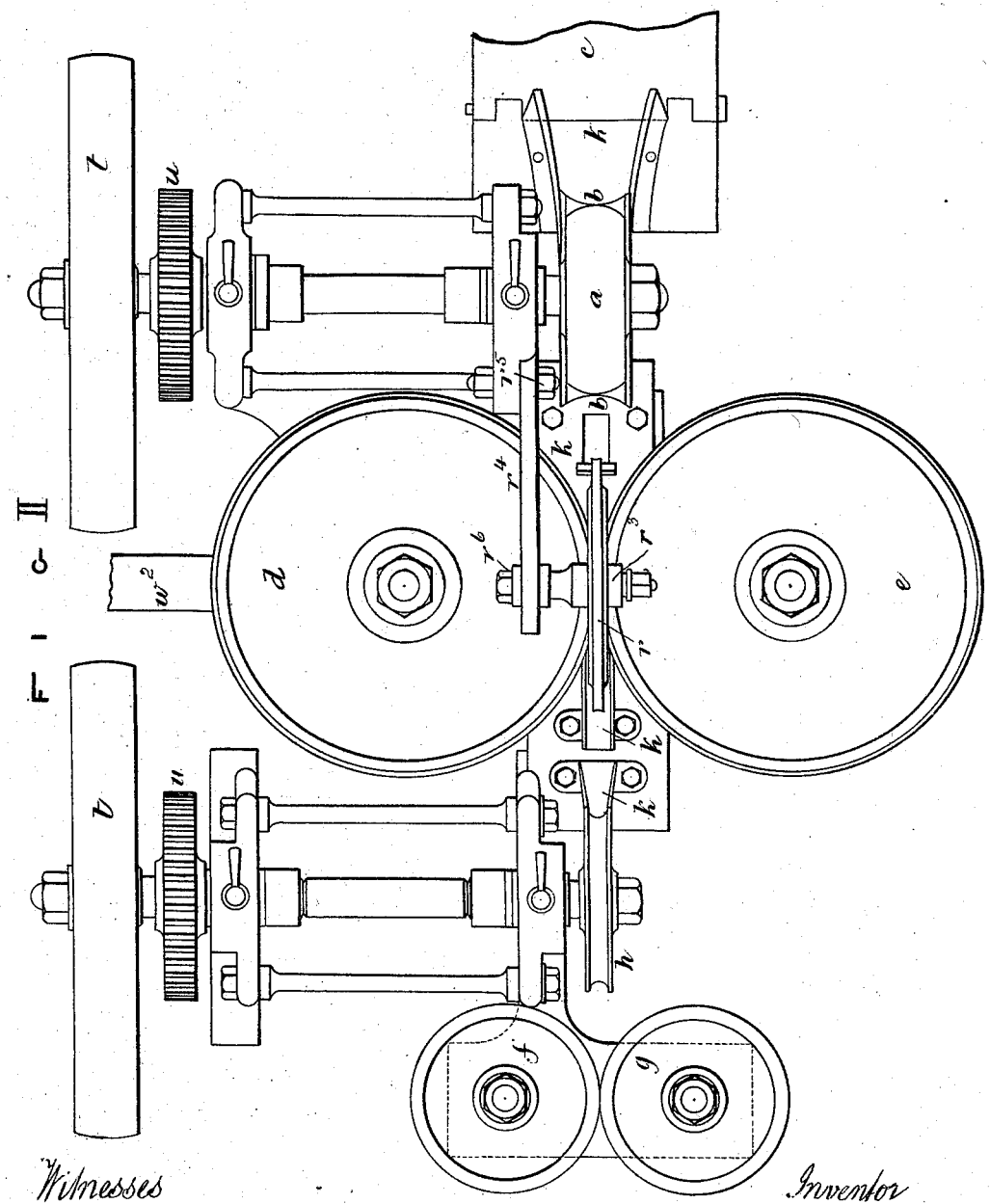

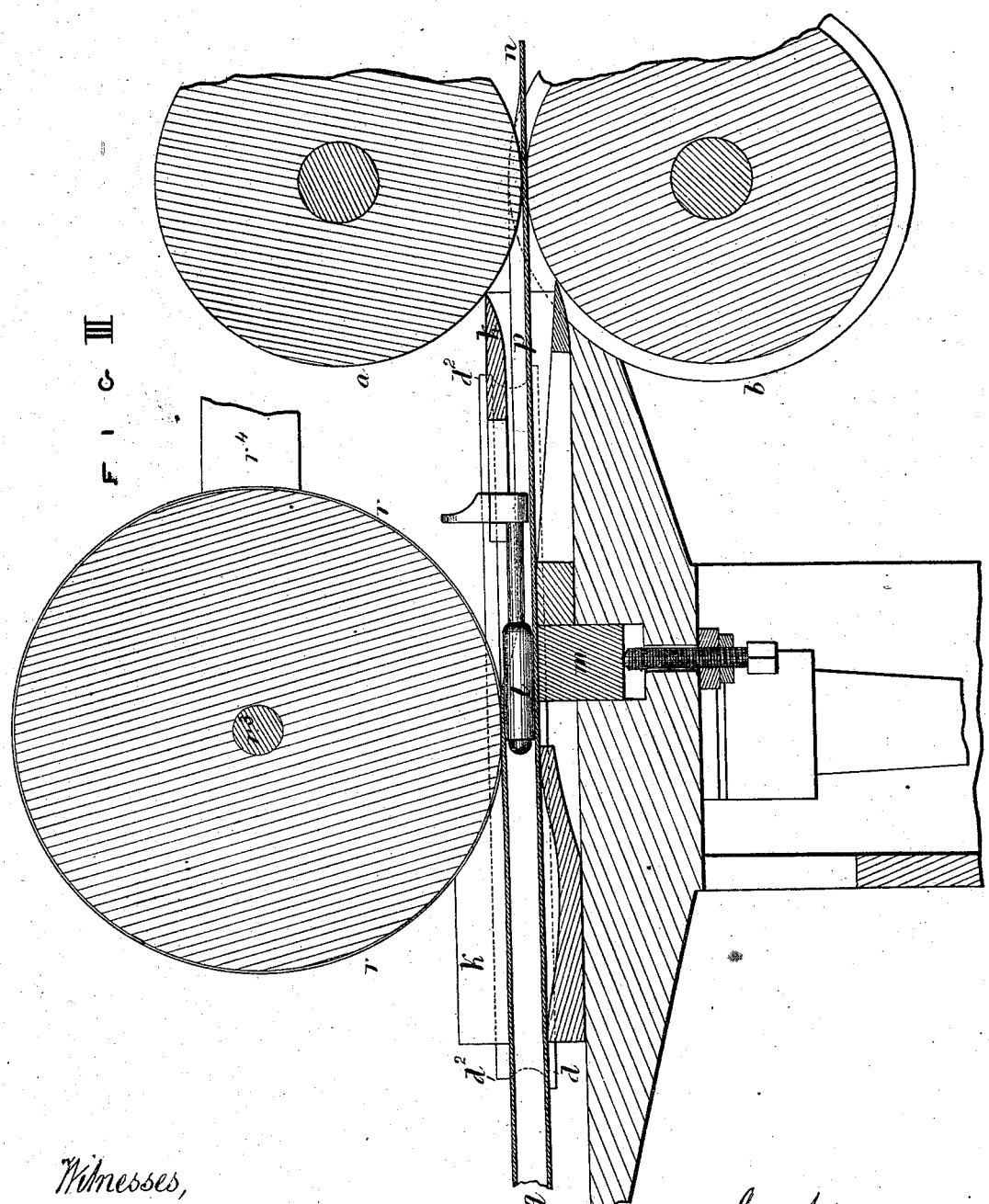

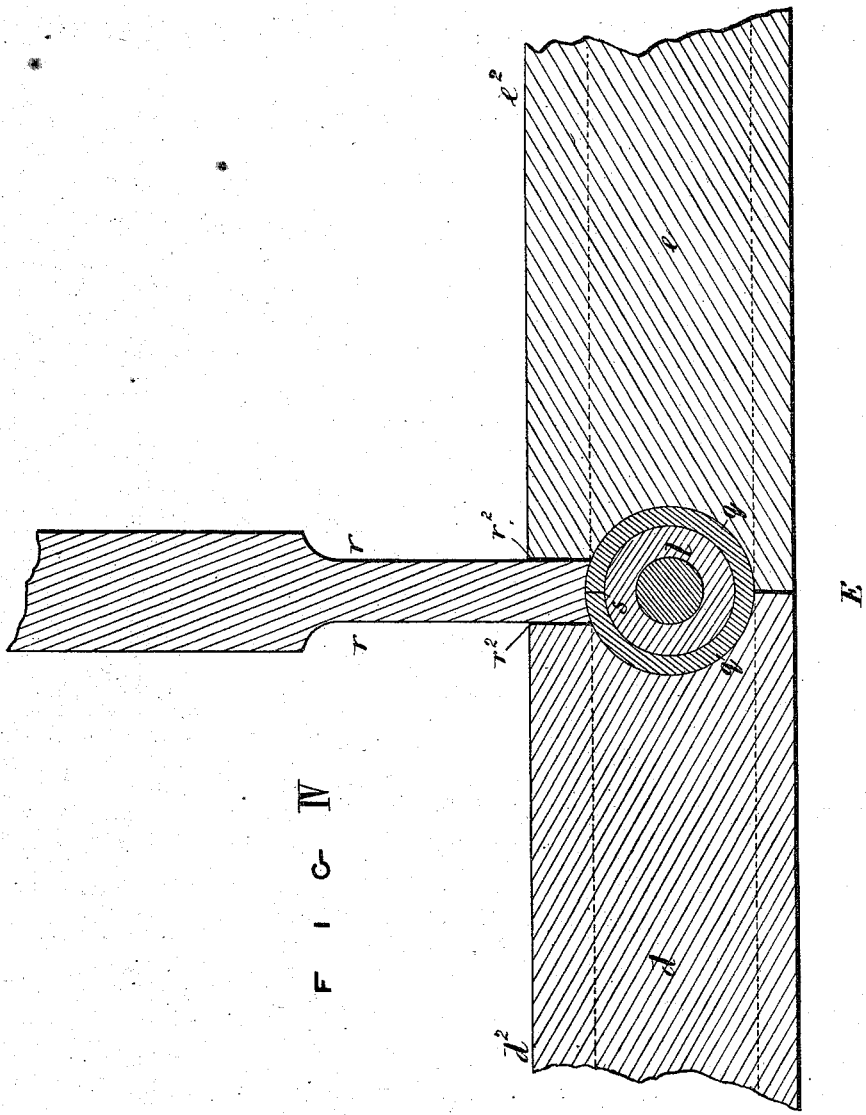

JOHN HUGGINS, OF BIRMINGHAM, ENGLAND, ASSIGNOR TO RICHARD CHAMBERLAIN, EDWIN LUDLOW, AND EDWARD LAWLEY PARKER, OF SAME PLACE.

IMPROVEMENT IN MACHINES FOR MAKING WELDED TUBING.

Specification forming part of Letters Patent No. 162,926, dated May 4, 1875; application filed February 17, 1875.

*To all whom it may concern:*

Be it known that I, JOHN HUGGINS, of Birmingham, in the county of Warwick, England, tube manufacturer and machinist, have invented certain Improvements in Machinery for the Manufacture of Welded Iron and Steel Tubes, of which the following is a specification:

My invention consists of improvements on an invention for which Letters Patent were granted to me on the 9th day of December, 1873. The invention described in the specification of, and secured to me by, the said Letters Patent is machinery for the manufacture of open-jointed and welded iron or steel tubes, and for the manufacture of tubes generally; and consists of combinations of rolls, guides, and other mechanical agents, whereby either open-jointed tubes or welded iron or steel tubes may be manufactured, the manufacture of the welded tubes being effected at one heat and by one operation.

My present invention refers only to the manufacture of welded iron and steel tubes; and consists, essentially, in the combination with or adaptation to the welding-rolls of the said machinery of a movable or rotating guide and welding-roll, the welding-rolls being slightly modified, for the purpose of fitting them to work in combination with the said rotating guide and welding-roll.

I make the welding-rolls in the manner described and represented in the specification hereinbefore referred to, excepting that one flange of each roll is of slightly less diameter than the other flanges, the flanges of less diameter being opposed to each other. By this construction the larger flanges of the two rolls work in contact, but the smaller flanges are a short distance apart, and into the space thus left between the two smaller flanges of the welding-rolls, the periphery of a third roll, at right angles to the welding-rolls, enters. The periphery of the said guide and welding roll is slightly concave, the concavity being of the same, or nearly the same, radius as the nearly semicircular grooves in the welding-rolls. A vertical transverse section being taken through the machine in the plane in which the axes of the said three rolls are situated, the said guide and welding roll will be found to form, with the two welding-rolls in the said section, a complete circle, the circular space thus inclosed being the passage through which the heated, partly-made tube is drawn and welded by the pressure of the said rolls. The opposed edges of the tube under process of welding are acted upon by the said guide and welding roll, and the cylindrical figures of the tube made very perfect. The pressure of the said guide and welding roll may be counterbalanced by a bearing-roll situated opposite to it, upon which bearing-roll the larger flanges of the welding-rolls bear.

Having explained the nature of my invention, I will proceed to describe, with reference to the accompanying drawing, the manner in which the same is to be performed.

Figure 1 represents, in side elevation, and Fig. 2 in plan, machinery for the manufacture of welded iron and steel tubes, constructed according to my said patent, with which said machinery mechanism constructed according to my present invention is combined; some parts of the machinery, forming no part of my present invention, are omitted. Fig. 3 represents, in vertical section, the pair of welding-rolls of the said machinery, and also the movable or rotating guide and third welding-roll, and the fixed guides; and Fig. 4 is a vertical section of portions of the pair of welding-rolls and guide and welding roll, drawn to a larger scale than Fig. 3, the said section, Fig. 4, being taken in a direction at right angles to that in which the section, Fig. 3, is taken.

The same letters of reference indicate the same parts in the several figures of the drawing.

$a$ $b$ are the bending-rolls, working in a vertical plane, by which said rolls the heated flat strips of iron or steel introduced between them are bent into a trough-like or semi-tubular figure. The said bending-rolls consists of an upper convex roll, $a$, and a lower concave roll, $b$. In front of the rolls $a$ $b$ is the table $c$, near to which is the furnace or muffle, (not represented,) by which the strips of iron or steel are heated to a welding-heat before they are introduced between the said bending-rolls $a\ b$. $d\ e$ is a pair of horizontal shaping and welding rolls, and $f\ g$ is a pair of horizontal shaping-rolls. Between the pairs of rolls $d\ e$ and $f\ g$ is a pair of vertical shaping-rolls, $h\ i$. Beyond the rolls $h\ i$ and $f\ g$ are other pairs of rolls, alternately vertical and horizontal, by which the tube is finished. These finishing-rolls are not represented in the drawings.

The pair of rolls $d\ e$, besides serving to bend or fashion the trough-like strip as it leaves the first bending-rolls into a tubular figure, also serve to weld the joint of the tube in its passage through the said rolls $d\ e$.

In front and behind each of the pairs of rolls fixed guides, marked $k\ k$, are situated, for guiding the partly-made tube into and out of the rolls. Between the grooves of the welding-rolls $d\ e$ is a plug or mandrel, $l$, (see Fig. 3,) for giving internal support to the partly-made tube as it passes through the said rolls.

In the nearly semicircular grooves of the welding-rolls $d\ e$, and situated immediately under the rear end of the plug or mandrel $l$, is an adjustable wedge-shaped block or support, $m$, (see Fig. 3,) for supporting the trough-like strip during its entrance into the grooves of the rolls $d\ e$. In Fig. 3, the heated flat strip of iron or steel before it enters the rolls $a\ b$ is marked $n$. The portion of the strip bent by the rolls $a\ b$ is marked $p$; and the trough-formed strip, after it has been fashioned into a tube and its opposed edges welded by the action of the rolls $d\ e$, is marked $q$. In combination with the pair of welding-rolls $d\ e$, I use a guide and welding roll, $r$, for assisting in the formation of the joint of the tube, and for perfecting the figure of the tube at the joint part thereof. The said guide-roll and welding-roll $r$ is situated in a vertical plane—that is, in a plane at right angles to that of the welding-rolls $d\ e$, and the said roll $r$ works in the space at $r^2$, (see Fig. 4,) between the flanges $d^2\ e^2$ of the welding-rolls $d\ e$. The periphery of the said guide and welding roll $r$ is concave, as represented. The flanges $d^2\ e^2$ of the rolls $d\ e$ are made of less diameter than the flanges on the opposite sides of the said rolls, for the purpose of permitting the third roll $r$ to work between them, as seen in Fig. 4. The concave periphery of the said third roll $r$ has the same or nearly the same radius as the nearly circular grooves of the welding-rolls $d\ e$, and the three rolls, where they meet, inclose a complete circular space, which space constitutes the passage through which the heated tube is drawn, and at which it is welded by the pressure of the said rolls $d\ e\ r$, as will be understood by an examination of Fig. 4, where a tube marked $q$ is represented upon the mandrel or plug $l$ in the act of being welded by the pressure of the said rolls $d\ e\ r$. It will also be seen by reference to the said Fig. 4 that the partly-made tube is completely supported both internally and externally during the welding process; and as the guide and welding roll $r$ acts directly on the joint $s$ of the tube $q$ the cylindrical figure of the tube at its welded edges is as perfect as the other parts of the tube—that is, the formation of a burr or feather by the metal being forced between the flanges of the rolls is avoided, the welding being at the same time made more perfect by the action of the said roll $r$. Besides assisting in the welding of the joint of the tube and perfecting the cylindrical figure of the tube at the joint part, the roll $r$ also assists in guiding the trough-like strip $p$ to the fashioning and welding rolls $d\ e$ and completing its tubular figure.

As the welded tube leaves the welding-rolls $d\ e$ it is carried in succession through the rolls $h\ i$ and $f\ g$ and the other rolls of the series and the guides of the said rolls, by the action of which rolls the metal of the tube is consolidated and the figure of the tube perfected, a welded tube being made at one heat and by one operation. The guide and welding roll $r$ turns on the axis $r^3$, which axis is carried by the arm $r^4$, connected by the pin and slot at $r^5$ to the frame or housing of the pair of bending-rolls $a\ b$. (See Fig. 1.) The guide and welding roll $r$ is adjusted vertically in the space at $r^2$, between the flanges $d^2\ e^2$ of the welding-rolls $d\ e$, by the pin and slot at $r^5$, and its horizontal position in the said space is adjusted by a screw-pin fixed by a nut taking into the slotted end $r^6$ of the arm $r^4$. When tubes of large size and strength of metal are to be manufactured, I prefer to support the peripheries of the welding-rolls $d\ e$ immediately under the lowest point of the guide and welding roll $r$, by means of a bearing-roll at E, Fig. 4. Each pair of rolls is worked independently of the others. Part of the gearing for driving the rolls is represented in Figs. 1 and 2, where it will be seen that the pairs of vertical rolls $a\ b$ and $h\ i$ are driven by bands passed over the driving-pulleys $t\ t$ on the end of one of the axes of the rolls, the axes of each pair of vertical rolls being geared together by toothed gearing at $u$. The horizontal rolls $d\ e$ are driven by bevel-gearing $v\ w$, the horizontal axis $w^2$ carrying the vertical bevel-wheels $w$, having on its end a driving-pulley. The horizontal rolls $f\ g$ and the other succeeding rolls need not be driven by gearing, as the tube under operation communicates a rotary motion to them.

Having now described the nature of my invention and the manner in which the same is to be performed, what I claim, and desire to secure by Letters Patent, is—

The hereinbefore-described and illustrated improvement on the machinery for which Letters Patent were granted me on the 9th day of December, 1873—that is to say, the addition to or combination with that pair of rolls of the said machinery by which the welding of the tube is effected, of a guide and welding roll for assisting in guiding the trough-like strip to the said welding-rolls, for assisting in welding the joint of the partly-made tube, and for perfecting the cylindrical figure of the said tube at the joint part, the said welding-rolls and guide and welding roll being constructed and combined and acting substantially as described and illustrated.

JOHN HUGGINS. [L. S.]

Witnesses:
 GEORGE SHAW,
 RICHARD SKERRETT,
  of 37 Temple street, Birmingham.